(12) United States Patent
Kiryu et al.

(10) Patent No.: US 12,157,355 B2
(45) Date of Patent: Dec. 3, 2024

(54) GUIDE RAIL

(71) Applicants: AISIN CORPORATION, Aichi (JP); TOYOTA JIDOSHA KABUSHIKI KAISHA, Toyota (JP); TOYOTA SHATAI KABUSHIKI KAISHA, Kariya (JP)

(72) Inventors: Tomohito Kiryu, Kariya (JP); Koichi Morita, Kariya (JP); Hideaki Kanasugi, Miyoshi (JP); Shunsuke Kanagai, Anjo (JP); Nobuo Hayama, Kariya (JP); Yusuke Kato, Kariya (JP); Nobuaki Sakai, Kariya (JP)

(73) Assignees: AISIN CORPORATION, Kariya (JP); TOYOTA JIDOSHA KABUSHIKI KAISHA, Toyota (JP); TOYOTA SHATAI KABUSHIKI KAISHA, Kariya (JP)

( * ) Notice: Subject to any disclaimer, the term of this patent is extended or adjusted under 35 U.S.C. 154(b) by 316 days.

(21) Appl. No.: 17/661,471

(22) Filed: Apr. 29, 2022

(65) Prior Publication Data
US 2022/0363113 A1   Nov. 17, 2022

(30) Foreign Application Priority Data
May 11, 2021   (JP) ................ 2021-080228

(51) Int. Cl.
*B60J 5/06* (2006.01)
*E05D 15/06* (2006.01)
*E05D 15/10* (2006.01)

(52) U.S. Cl.
CPC ............ *B60J 5/06* (2013.01); *E05D 15/0621* (2013.01); *E05D 2015/1026* (2013.01); *E05Y 2201/614* (2013.01)

(58) Field of Classification Search
CPC ............................ B60J 5/06; E05Y 2201/614
USPC ............................................. 296/155; 49/423
See application file for complete search history.

(56) References Cited

U.S. PATENT DOCUMENTS

| | | | |
|---|---|---|---|
| 8,152,221 B2 * | 4/2012 | Yoshioka | E05D 15/1081 296/155 |
| 8,464,469 B2 * | 6/2013 | Oberheide | E05F 15/646 49/360 |
| 2015/0033503 A1 | 2/2015 | Yamada et al. | |
| 2015/0291013 A1 | 10/2015 | Okuma et al. | |
| 2020/0399944 A1 | 12/2020 | Morioka et al. | |

FOREIGN PATENT DOCUMENTS

| | | | |
|---|---|---|---|
| DE | 60309537 T2 * | 9/2007 | B60J 10/06 |
| JP | 61-9478 U | 1/1986 | |
| JP | 2-30724 U | 2/1990 | |

(Continued)

OTHER PUBLICATIONS

Text DE60309537 (Year: 2007).*

*Primary Examiner* — Dennis H Pedder
(74) *Attorney, Agent, or Firm* — Finnegan, Henderson, Farabow, Garrett and Dunner, LLP (57) ABSTRACT

A guide rail includes: a first rail that has a bottom wall on which a load roller rolls and supports the weight of a sliding door; a second rail that has side walls on which two guide rollers roll and defines a moving direction of the sliding door; and a first restriction part that restricts the motion of the load roller in an axial direction.

4 Claims, 8 Drawing Sheets

(56) References Cited

FOREIGN PATENT DOCUMENTS

| JP | 2000-145273 A | 5/2000 |
| JP | 2010-195303 A | 9/2010 |
| JP | 2013-181330 A | 9/2013 |
| JP | 2015-202863 A | 11/2015 |
| JP | 2021-001531 A | 1/2021 |

\* cited by examiner

GUIDE RAIL

CROSS-REFERENCE TO RELATED APPLICATION

This application claims priority to Japanese Patent Application No. 2021-080228 filed on May 11, 2021, incorporated herein by reference in its entirety.

BACKGROUND

1. Technical Field

The present disclosure relates to a guide rail.

2. Description of Related Art

Japanese Unexamined Patent Application Publication No. 2010-195303 discloses a vehicle including a vehicle body that has a door opening and a sliding door that opens and closes the door opening. The vehicle body includes a lower rail, a center rail, and an upper rail as guide rails that define the moving direction of the sliding door. The sliding door includes a lower roller unit, an upper roller unit, and a center roller unit that engage with the lower rail, the upper rail, and the center rail, respectively.

The lower roller unit has lower rollers that rotate in contact with the lower rail. The lower rollers include a load roller that supports the weight of the sliding door and guide rollers that restrict the motion of the sliding door in a width direction. A rotational axis of the load roller and rotational axes of the guide rollers are orthogonal to each other. Similarly, the center roller unit has center rollers that rotate in contact with the center rail, and the upper roller unit has upper rollers that rotate in contact with the upper rail.

SUMMARY

In the vehicle as described above, the sliding door is supported on the vehicle body as the lower rollers, the center rollers, and the upper rollers engage with the lower rail, the center rail, and the upper rail, respectively. Therefore, the lower rollers, the center rollers, and the upper rollers are required not to fall off the lower rail, the center rail, and the upper rail, respectively, even when a great load acts on the sliding door. In other words, the sliding door is required not to fall off the vehicle body.

A guide rail according to an aspect of the present disclosure is installed in a vehicle body having a door opening and defines a moving direction of a sliding door that opens and closes the door opening. The sliding door has a hinge unit including a load roller that rotates around an axis extending in a horizontal direction and two guide rollers that rotate around axes extending in an up-down direction. The guide rail includes: a first rail that has a bottom wall on which the load roller rolls and supports the weight of the sliding door; a second rail that has side walls on which the two guide rollers roll and defines the moving direction of the sliding door; and a first restriction part that restricts the motion of the load roller in an axial direction.

When the vehicle has an accident, a load in a vehicle width direction may act on the sliding door and cause the load roller of the hinge unit to shift in the axial direction relatively to the guide rail. In this regard, the guide rail of the above configuration includes the first restriction part that restricts the motion of the load roller in the axial direction. Thus, this guide rail can reduce the likelihood that the sliding door may fall off the vehicle body when a load acts on the sliding door.

In the above aspect, the first rail may have, as the first restriction part, a first restriction wall that extends from the bottom wall in a direction intersecting the bottom wall. In the guide rail of this configuration, the first restriction wall and the bottom wall are formed as one part. This can reduce the number of parts composing the guide rail.

In the above configuration, as seen in a plan view from a plate thickness direction, the bottom wall may have a straight part that extends straight and a curved part that extends in an arc shape from an end portion of the straight part, and the first restriction wall may extend from the curved part of the bottom wall.

When the sliding door is located in a fully closed position, the load roller is located on the curved part of the bottom wall, and when the sliding door is located in a fully opened position, the load roller is located on the straight part of the bottom wall. On the other hand, it is highly likely that the sliding door is located in the fully closed position when the vehicle has an accident. In this regard, in the guide rail of the above configuration, the first restriction wall extends from the curved part of the bottom wall. Thus, the guide rail can be provided with the first restriction wall at a part of the bottom wall where it is needed.

The guide rail of the above aspect may further include a second restriction part that restricts the motion of the two guide rollers in the axial direction. As described above, when the vehicle has an accident, a load in the vehicle width direction may act on the sliding door and cause the guide rollers of the hinge unit to shift in the axial direction relatively to the guide rail. In this regard, the guide rail of this configuration includes the second restriction part that restricts the motion of the guide rollers in the axial direction. Thus, this guide rail can reduce the likelihood that the sliding door may fall off the vehicle body when a load acts on the sliding door.

The guide rail of the above configuration may further include a reinforcing rail that is fixed to the second rail, and the reinforcing rail may have the second restriction part. In the guide rail of this configuration, the second restriction part is provided on the reinforcing rail that is formed as a separate part from the second rail. Thus, compared with when the second restriction part is provided on the second rail, the structure of the second rail is simplified.

The guide rail of the above aspect may be applied as an upper rail that is disposed at a higher level than the door opening. When a load directed outward in the vehicle width direction acts on the sliding door, the sliding door may deform so as to bend. In this case, the hinge unit that engages with the upper rail disposed at a higher level than the door opening tries to shift obliquely outward in the vehicle width direction as well as downward in a vehicle up-down direction. As a result, the hinge unit is likely to come off the side walls of the upper rail. In this regard, the upper rail of the above configuration includes the first restriction part, and therefore can effectively reduce the likelihood that the hinge unit may fall off when such a load acts on the sliding door.

The guide rail of the above aspect can reduce the likelihood that the sliding door may fall off the vehicle body when a load acts on the sliding door.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A vehicle including a guide rail according to one embodiment will be described below.

Vehicle 10

Figure 1:
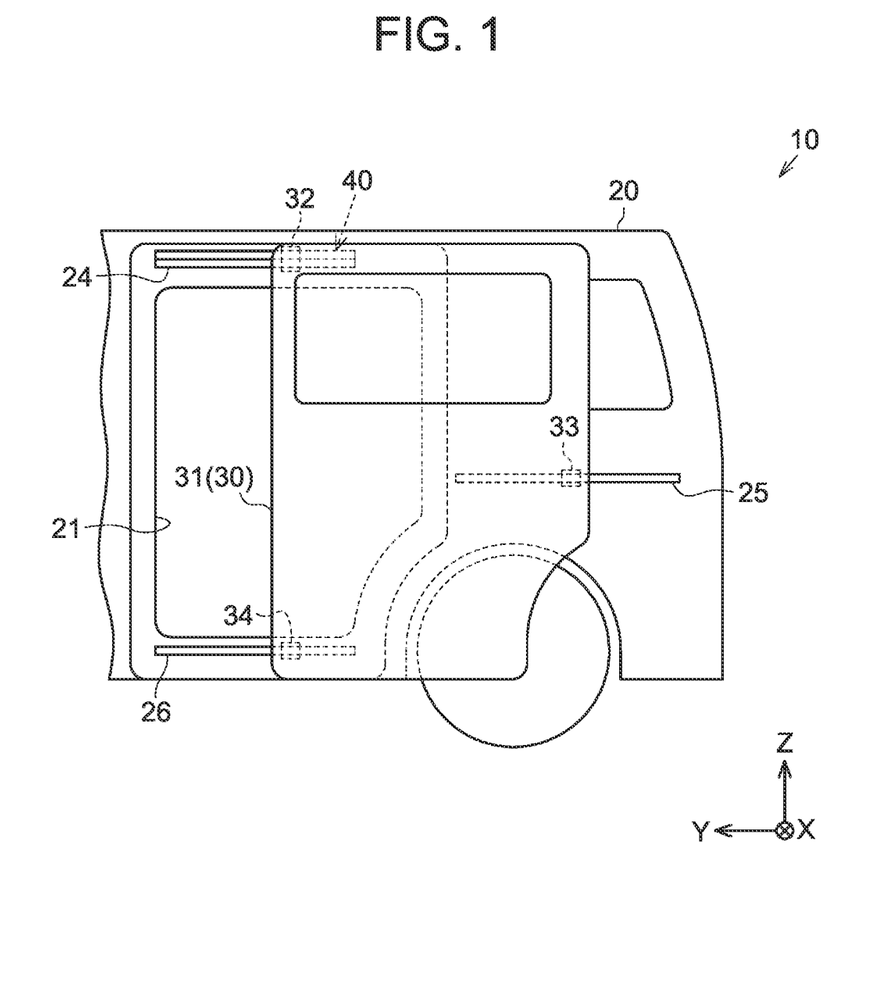
FIG. 1 is a schematic view of a vehicle according to one embodiment.

As shown in FIG. 1, the vehicle 10 includes a vehicle body 20 that has a door opening 21, a sliding door 30 that opens and closes the door opening 21, and a door actuator 40 that actuates the sliding door 30.

In the following description, a vehicle width direction, a vehicle front-rear direction, and a vehicle up-down direction will also be referred to as a "width direction," a "front-rear direction," and an "up-down direction," respectively. In the drawings, the X axis, the Y axis, and the Z axis are axes extending in the width direction, the front-rear direction, and the up-down direction, respectively. In the width direction, a direction toward the center of the vehicle 10 will also be referred to as "inward " in the width direction, and the opposite direction from inward will also be referred to as "outward."

Vehicle Body 20

As shown in FIG. 1, the door opening 21 opens in a side surface of the vehicle body 20. As seen in a side view from the width direction, the door opening 21 has a rectangular shape with a short-side direction and a long-side direction oriented in the front-rear direction and the up-down direction, respectively. The door opening 21 may open in only a right side surface of the vehicle 10 or only a left side surface of the vehicle 10, or may open in both side surfaces of the vehicle 10.

Figure 2:
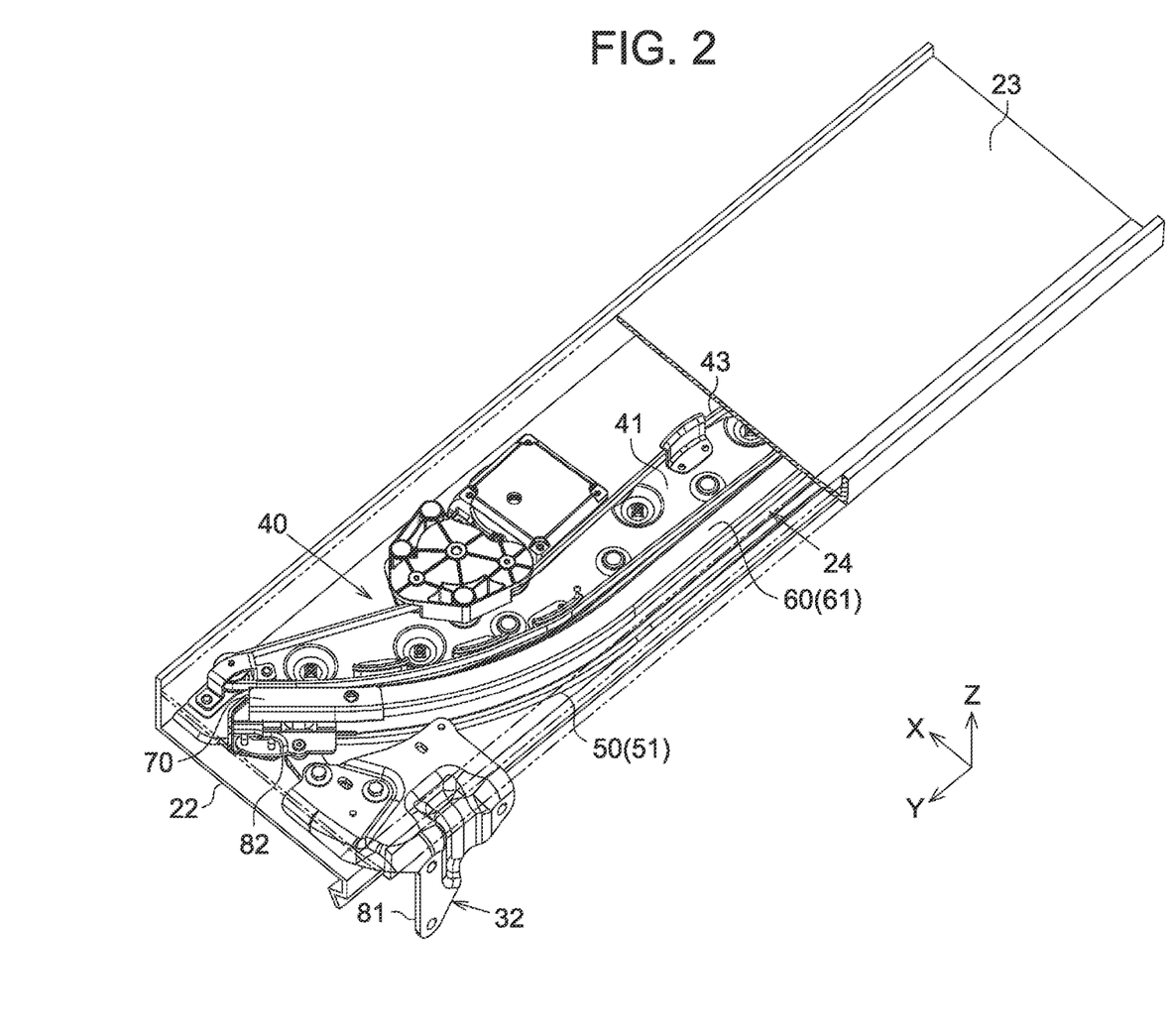
FIG. 2 is a perspective view showing a relationship among an upper rail, an upper hinge unit, and a door actuator.

As shown in FIG. 2, the vehicle body 20 includes a first panel 22 and a second panel 23 that are disposed at a higher level than the door opening 21. As shown in FIG. 1, the vehicle body 20 includes an upper rail 24, a center rail 25, and a lower rail 26 that are installed around the door opening 21.

As shown in FIG. 2, the first panel 22 and the second panel 23 have a rectangular plate shape with a short-side direction and a long-side direction oriented in the width direction and the front-rear direction, respectively. It is preferable that the first panel 22 and the second panel 23 be made of a metal material having rigidity. With reference to a side surface of the vehicle body 20, the first panel 22 and the second panel 23 extend inward in the width direction of the vehicle 10. The first panel 22 and the second panel 23 are disposed with a clearance left therebetween in the up-down direction. The space between the first panel 22 and the second panel 23 is a space to house the upper rail 24 and the door actuator 40.

As shown in FIG. 1, the upper rail 24 is disposed on an upper side of the door opening 21. The center rail 25 is disposed on a rear side of the door opening 21. The lower rail 26 is disposed on a lower side of the door opening 21. The center rail 25 is disposed at a lower level than the upper rail 24 and a higher level than the lower rail 26. The upper rail 24, the center rail 25, and the lower rail 26 correspond to examples of the "guide rail" that defines the moving direction of the sliding door 30.

Figure 3:
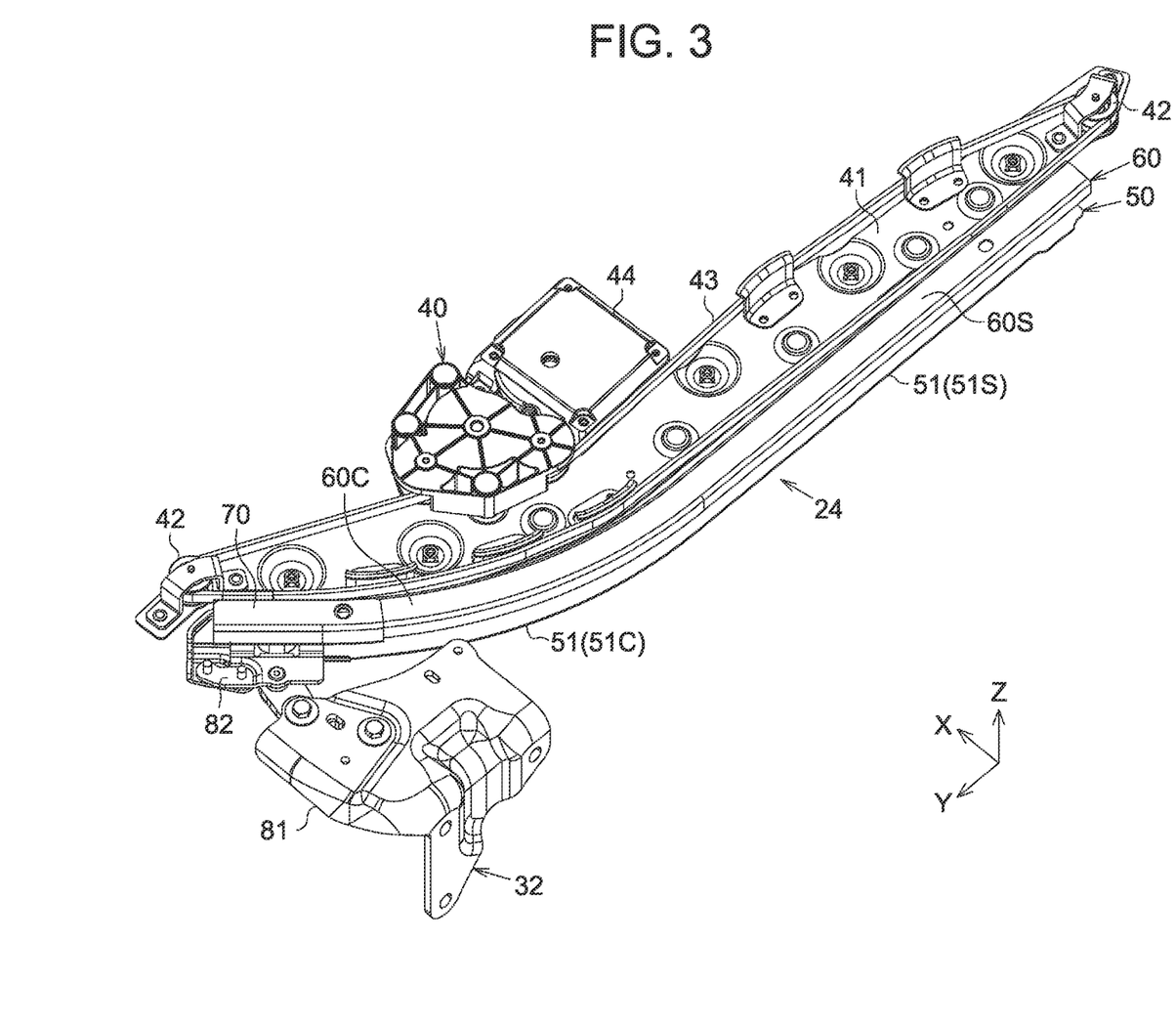
FIG. 3 is a perspective view showing the relationship among the upper rail, the upper hinge unit, and the door actuator.

As shown in FIG. 2 and FIG. 3, the upper rail 24 has a first rail 50 that is fixed to an upper surface of the first panel 22, a second rail 60 that is fixed to a lower surface of the second panel 23, and a reinforcing rail 70 that reinforces the second rail 60. The first rail 50, the second rail 60, and the reinforcing rail 70 are formed as separate parts.

Figure 4:
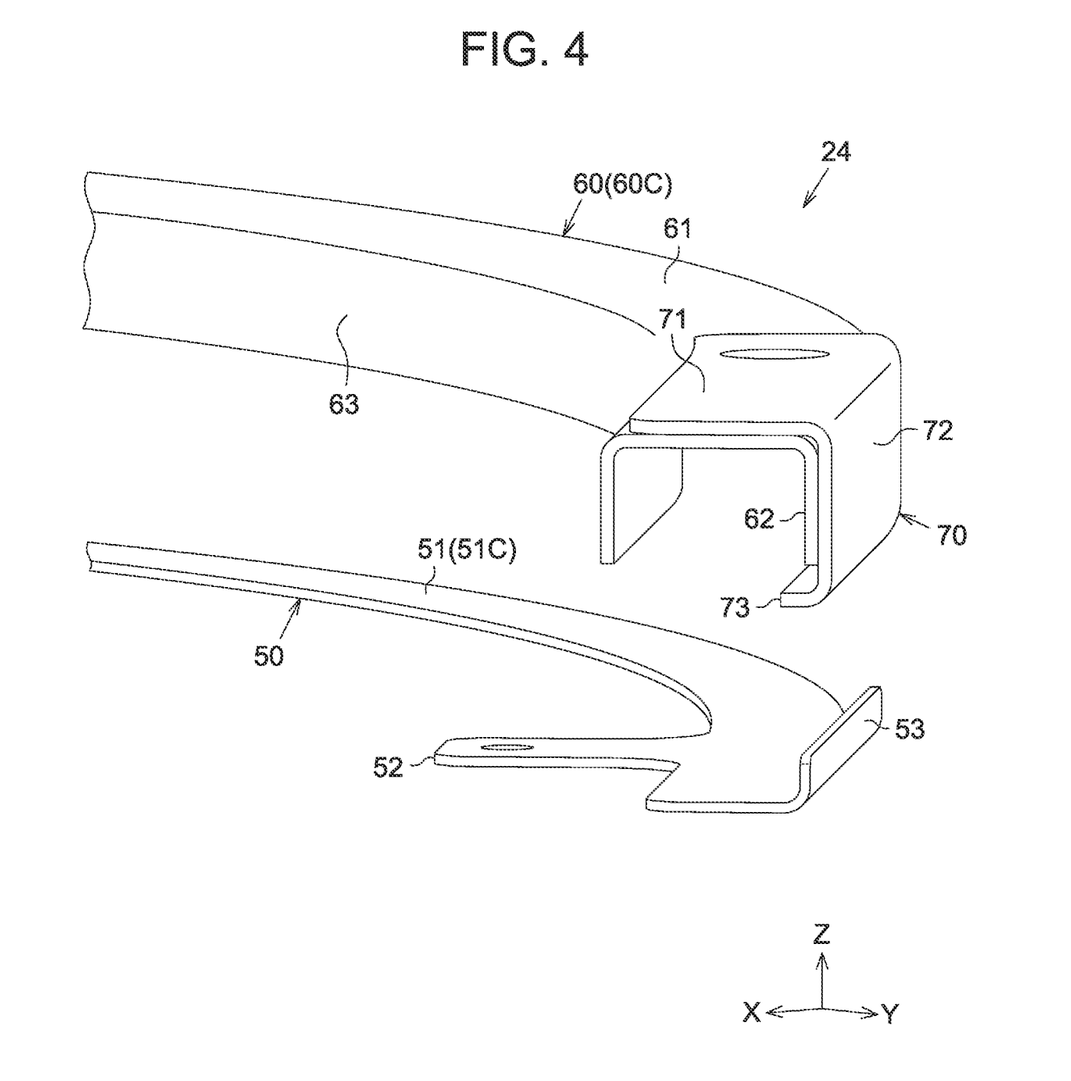
FIG. 4 is a perspective view of a front end portion of the upper rail.

As shown in FIG. 4, the first rail 50 has an elongated bottom wall 51, a branch wall 52 that branches off from the bottom wall 51, and a first restriction wall 53 that bends from the bottom wall 51. The first rail 50 is formed by, for example, pressing a metal plate.

As shown in FIG. 3 and FIG. 4, the bottom wall 51 includes a straight part 51S that extends straight frontward, and a curved part 51C that extends in an arc shape inward in the width direction while extending frontward from a front end of the straight part 51S. An upper surface of the bottom wall 51 is a rolling surface on which a load roller 86 of an upper hinge unit 32, to be described later, rolls. Therefore, it is preferable that the upper surface of the bottom wall 51 be smooth from end to end in a long-side direction. As shown in FIG. 4, the branch wall 52 extends from the curved part 51C of the bottom wall 51 in a direction intersecting both the long-side direction of the bottom wall 51 and a plate thickness direction of the bottom wall 51.

The first restriction wall 53 extends from the curved part 51C of the bottom wall 51 in a direction intersecting the bottom wall 51. In other words, the first restriction wall 53 extends upward from the curved part 51C of the bottom wall 51. The first restriction wall 53 has a rectangular plate shape with a long-side direction and a short-side direction oriented in the long-side direction of the bottom wall 51 and the plate thickness direction of the bottom wall 51, respectively. As one example, the length of the first restriction wall 53 in the long-side direction is about a few centimeters to a few tens of centimeters. It is preferable that the height of the first restriction wall 53 be determined within such a range that it does not interfere with the upper hinge unit 32 to be described later. The first restriction wall 53 corresponds to one example of the "first restriction part."

As shown in FIG. 2, the first rail 50 is fixed to the upper surface of the first panel 22. Specifically, the bottom wall 51 of the first rail 50 is attached to the first panel 22 of the vehicle body 20 using an adhesive tape or the like. The branch wall 52 of the first rail 50 is fixed to the first panel 22 of the vehicle body 20 by a fastening member, such as a bolt, or a pin. In this case, the motion of the branch wall 52 of the first rail 50 should be restricted at least in directions orthogonal to the plate thickness direction of the branch wall 52, such as the front-rear direction and the width direction.

As shown in FIG. 3, the second rail 60 extends straight frontward and then curves inward in the width direction while extending frontward. In the following description, the part of the second rail 60 that extends straight frontward will also be referred to as a straight part 60S, and the part thereof that extends in an arc shape inward in the width direction while extending frontward from a front end of the straight part 60S will also be referred to as a curved part 60C. The second rail 60 has a uniform cross-sectional shape from end to end in a long-side direction.

As shown in FIG. 4, the second rail 60 has an upper wall 61 and two side walls 62, 63 extending from the upper wall 61. The second rail 60 is formed by, for example, extruding a metal material. The upper wall 61 and the two side walls 62, 63 have a plate shape. As seen in a sectional view orthogonal to the long-side direction of the second rail 60, the two side walls 62, 63 extend parallel to each other respectively from end portions of the upper wall 61.

As shown in FIG. 2, the second rail 60 is fixed to a lower surface of the second panel 23. Specifically, the second rail 60 is fixed to the second panel 23 by performing welding or using a fastening member, such as a bolt. In a state where the first rail 50 and the second rail 60 are fixed to the first panel 22 and the second panel 23, the bottom wall 51 of the first rail 50 and the upper wall 61 of the second rail 60 face each other in the up-down direction.

As shown in FIG. 3 and FIG. 4, the reinforcing rail 70 is an elongated member. The reinforcing rail 70 has a uniform cross-sectional shape from end to end in a long-side direction. The length of the reinforcing rail 70 in the long-side direction is shorter than the length of the curved part 60C of the second rail 60 in the long-side direction. As one example, the length of the reinforcing rail 70 in the long-side direction is about a few centimeters to a few tens of centimeters. The reinforcing rail 70 may be formed by, for example, extruding a metal material or pressing a metal plate.

As shown in FIG. 4, the reinforcing rail 70 has a first fixed wall 71, a second fixed wall 72 that bends and extends from the first fixed wall 71, and a second restriction wall 73 that bends and extends from the second fixed wall 72. The first fixed wall 71, the second fixed wall 72, and the second restriction wall 73 have a rectangular plate shape.

The length of the first fixed wall 71 in a short-side direction is equivalent to the length of the upper wall 61 of the second rail 60 in the short-side direction. The length of the second fixed wall 72 in a short-side direction is longer than the length of the side wall 62 of the second rail 60 in the short-side direction. The length of the second restriction wall 73 in a short-side direction is shorter than the length of the first fixed wall 71 in the short-side direction. The second restriction wall 73 faces the first fixed wall 71. The second restriction wall 73 corresponds to one example of the "second restriction part."

The reinforcing rail 70 is fixed to the curved part 60C of the second rail 60. When the reinforcing rail 70 is fixed to the second rail 60, the first fixed wall 71 and the second fixed wall 72 cover the upper wall 61 and the side wall 62, respectively, of the second rail 60. The second restriction wall 73 extends along the upper wall 61 of the second rail 60 while avoiding the side wall 62 of the second rail 60. Thus, the second restriction wall 73 faces the upper wall 61 of the second rail 60.

While the configurations of the center rail 25 and the lower rail 26 will not be described, they are similar to the configuration of the upper rail 24. However, the center rail 25 and the lower rail 26 should at least have a component corresponding to the second rail 60 of the upper rail 24. In other words, the center rail 25 and the lower rail 26 may or may not include the first restriction wall 53 and the second restriction wall 73.

Sliding Door 30

As shown in FIG. 1, the sliding door 30 includes a door main body 31 of a size corresponding to the door opening 21, and the upper hinge unit 32, a center hinge unit 33, and a lower hinge unit 34 that constitute coupling points to the vehicle body 20.

The upper hinge unit 32 and the lower hinge unit 34 are fixed near a front end of the door main body 31, and the center hinge unit 33 is fixed near a rear end of the door main body 31. The upper hinge unit 32 is fixed to an upper end portion of the door main body 31, and the lower hinge unit 34 is fixed to a lower end portion of the door main body 31. The center hinge unit 33 is fixed to a center portion of the door main body 31 in the up-down direction.

Figure 5:
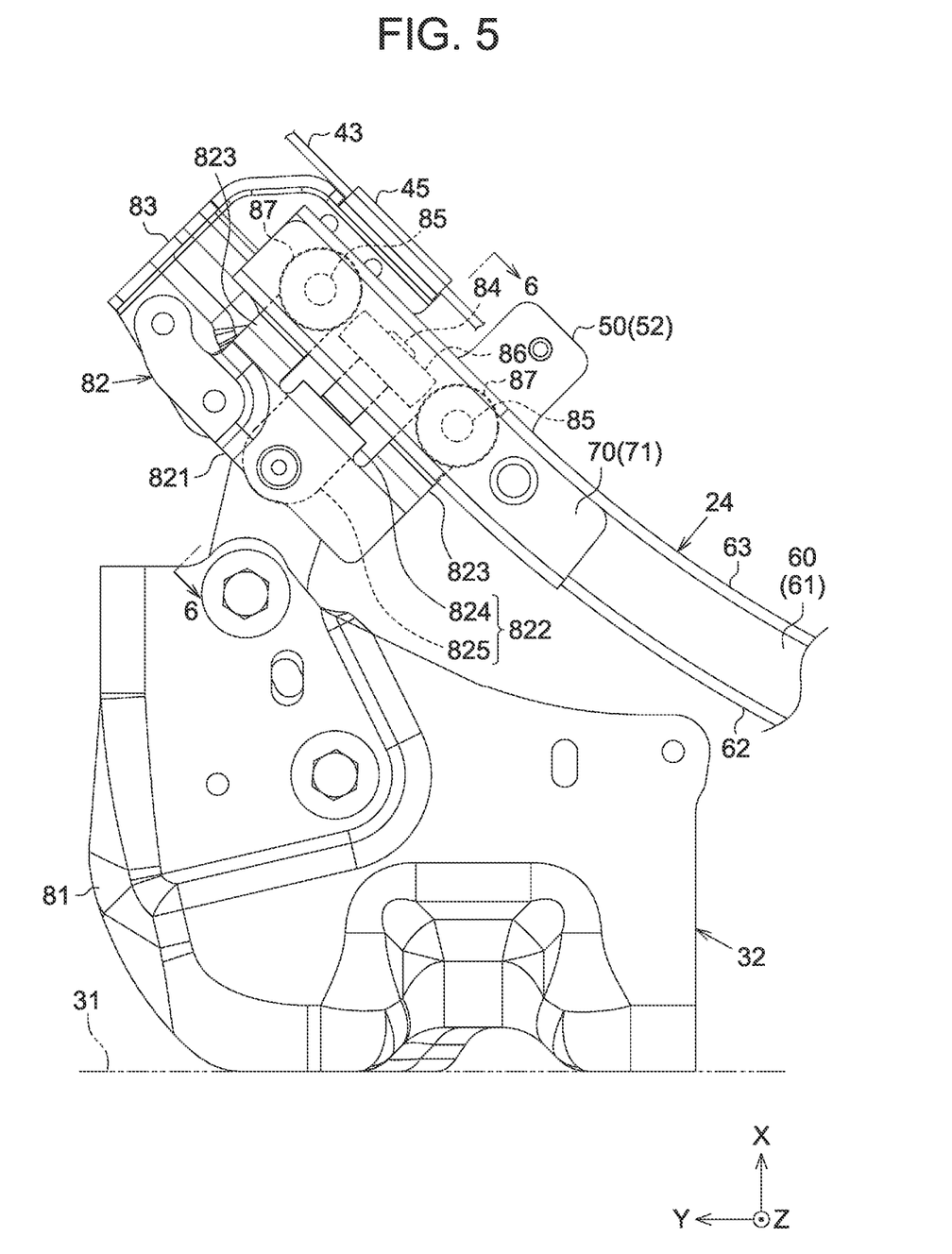
FIG. 5 is a plan view of the front end portion of the upper rail and the upper hinge unit.

As shown in FIG. 5, the upper hinge unit 32 has a fixed hinge 81 that is fixed to the door main body 31, a movable hinge 82 that is supported so as to be swingable relatively to the fixed hinge 81, and a belt bracket 83 to which power is transmitted from the door actuator 40. The upper hinge unit 32 further has a first support shaft 84 and two second support shafts 85 that are fixed to the movable hinge 82, a load roller 86 that is rotatably supported on the first support shaft 84, and two guide rollers 87 that are rotatably supported on the two second support shafts 85.

As shown in FIG. 5, the movable hinge 82 has a base part 821 that is coupled to the fixed hinge 81, and a first branch part 822 and two second branch parts 823 that branch off and extend from the base part 821. As seen in a plan view, the base part 821 has a rectangular plate shape. In the base part 821, an axis of swinging of the movable hinge 82 extends in the up-down direction. The belt bracket 83 is fixed to the base part 821.

The first branch part 822 extends from a center portion in a long-side direction of the base part 821. The first branch part 822 includes a first bent portion 824 that extends perpendicularly from the base part 821, and a second bent portion 825 that extends perpendicularly from the first bent portion 824. The first bent portion 824 extends downward from the base part 821, and the second bent portion 825 extends from the first bent portion 824 toward the fixed hinge 81. The first bent portion 824 supports the first support shaft 84. In this case, an axis of the first support shaft 84 extends in a horizontal direction. The second bent portion 825 faces the base part 821. The second bent portion 825 is coupled to the fixed hinge 81 along with the base part 821. The two second branch parts 823 extend from both end portions in the long-side direction of the base part 821. The two second branch parts 823 extend from the base part 821 along the axis of the first support shaft 84. The two second branch parts 823 respectively support the two second support shafts 85. In this case, rotational axes of the two second support shafts 85 extend in the up-down direction.

The load roller 86 is supported at a leading end of the first support shaft 84, and the two guide rollers 87 are respectively supported at leading ends of the two second support shafts 85. Thus, the load roller 86 and the two guide rollers 87 can be said to be rotatably supported by the movable hinge 82 through the first support shaft 84 and the two second support shafts 85. A rotational axis of the load roller 86 extends in a horizontal direction, and rotational axes of the two guide rollers 87 extend in the up-down direction. Here, the rotational axis of the load roller 86 may be slightly inclined relatively to the horizontal direction and the rotational axes of the two guide rollers 87 may be slightly inclined relatively to the up-down direction due to error involved in the manufacture and assembly of the vehicle 10 or other causes.

Figure 6:
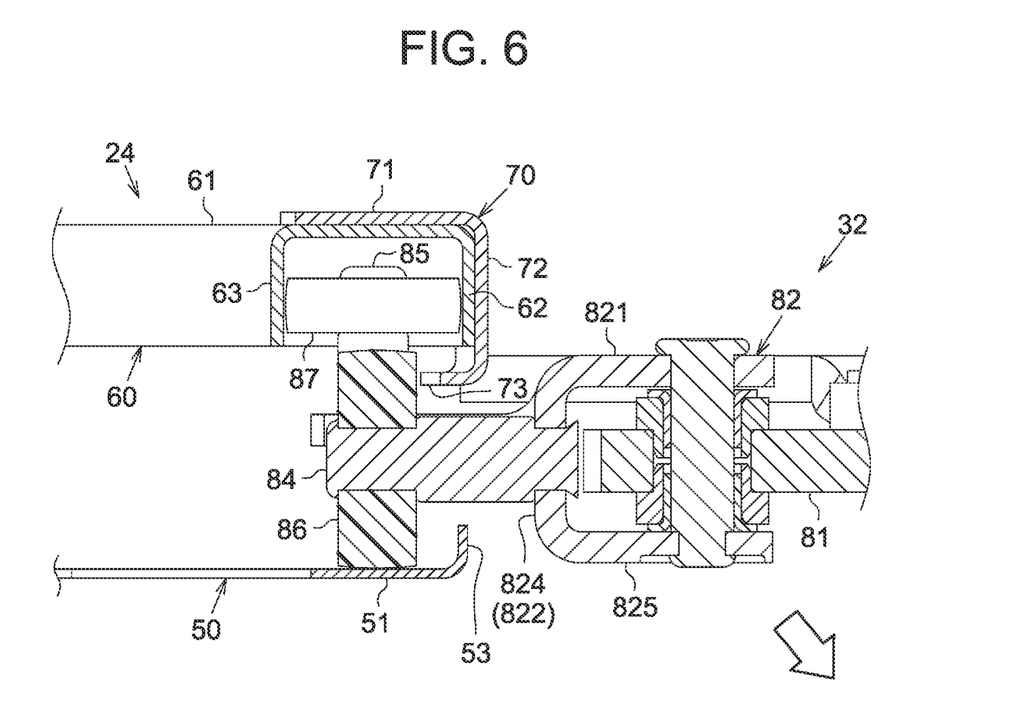
FIG. 6 is a sectional view showing an engaging relationship between the upper rail and the upper hinge unit.

As shown in FIG. 6, the load roller 86 is disposed between the bottom wall 51 of the first rail 50 and the upper wall 61 of the second rail 60, and the two guide rollers 87 are disposed between the two side walls 62, 63 of the second rail 60. Thus, the upper hinge unit 32 is supported on the upper rail 24. Here, the load roller 86 is placed on the bottom wall 51 of the first rail 50 and the two guide rollers 87 are placed on one side wall 62 of the second rail 60. Thus, the first rail 50 supports the weight of the sliding door 30 and the second rail 60 restricts the motion of the sliding door 30 in a plate thickness direction of the side walls 62, 63.

As shown in FIG. 6, the diameter of the load roller 86 is larger than the clearance between the first rail 50 and the second rail 60 in the up-down direction. Specifically, the diameter of the load roller 86 is larger than the clearance between the first restriction wall 53 of the first rail 50 and the second restriction wall 73 of the second rail 60. The diameters of the two guide rollers 87 are smaller than the clearance between the two side walls 62, 63 of the second rail 60. On the other hand, the diameters of the two guide rollers 87 are larger than the clearance between the other side wall 63 of the second rail 60 and a leading end of the second restriction wall 73. Thus, as seen in the sectional view shown in FIG. 6, when one tries to detach the upper hinge unit 32 from the upper rail 24 in the axial direction of the load roller 86 and the axial direction of the two guide rollers 87, the load roller 86 and the two guide rollers 87 get caught on the upper rail 24.

While the configurations of the center hinge unit 33 and the lower hinge unit 34 will not be described, they are similar to the configuration of the upper hinge unit 32. However, when the center rail 25 does not include a component corresponding to the first rail 50, the center hinge unit 33 need not include the load roller 86. Similarly, when the lower rail 26 does not include a component corresponding to the first rail 50, the lower hinge unit 34 need not include the load roller 86.

Thus, the upper hinge unit 32, the center hinge unit 33, and the lower hinge unit 34 are supported on the upper rail 24, the center rail 25, and the lower rail 26, respectively. As the upper hinge unit 32, the center hinge unit 33, and the lower hinge unit 34 move along the upper rail 24, the center rail 25, and the lower rail 26, respectively, the sliding door 30 becomes able to move relatively to the vehicle body 20. For example, when the upper hinge unit 32 moves relatively to the upper rail 24, the load roller 86 rolls relatively to the bottom wall 51 of the first rail 50 and the two guide rollers 87 roll relatively to the side wall 62 of the second rail 60.

Door Actuator 40

As shown in FIG. 3, the door actuator 40 includes a support frame 41 that has a plate shape, two idler pulleys 42 that are rotatably supported on the support frame 41, a belt 43 that is wrapped around the two idler pulleys 42, and a motor unit 44 that drives the belt 43. As shown in FIG. 5, the door actuator 40 includes a coupling part 45 that couples the belt 43 and the belt bracket 83 of the upper hinge unit 32 together.

As shown in FIG. 2, the door actuator 40 is installed on the first panel 22 so as to be adjacent to the upper rail 24. When the belt 43 is driven in a clockwise direction as seen in a plan view of the door actuator 40, the coupling part 45 moves frontward. In this case, the upper hinge unit 32 moves frontward, so that the sliding door 30 closes toward a fully closed position. Conversely, when the belt 43 is driven in a counterclockwise direction as seen in a plan view of the door actuator 40, the coupling part 45 moves rearward. In this case, the upper hinge unit 32 moves rearward, so that the sliding door 30 opens toward a fully opened position.

The workings of this embodiment will be described. FIG. 6 shows a positional relationship between the upper rail 24 and the upper hinge unit 32 when the sliding door 30 is located in the fully closed position. As shown in FIG. 6, the load roller 86 of the upper hinge unit 32 is placed on the first rail 50 of the upper rail 24 and the two guide rollers 87 of the upper hinge unit 32 are placed on the second rail 60 of the upper rail 24.

Here, a case will be considered in which the vehicle 10 has an accident and consequently an occupant riding in a rear seat or an object placed on the rear seat hits hard against the sliding door 30. In other words, a case in which a load directed outward in the width direction acts intensely on a center portion of the sliding door 30 will be considered.

In this case, as seen in a front view from the front side, the center portion of the sliding door 30 bends outward in the width direction, so that an upper end portion of the sliding door 30 shifts outward in the width direction as well as downward, while a lower end portion of the sliding door 30 shifts outward in the width direction as well as upward. Thus, the upper hinge unit 32 is pulled in the direction indicated by an outlined arrow in FIG. 6. As a result, in a comparative example including an upper rail that does not have the first restriction wall 53 and the second restriction wall 73, the upper hinge unit 32 may fall off the upper rail.

Figure 7:
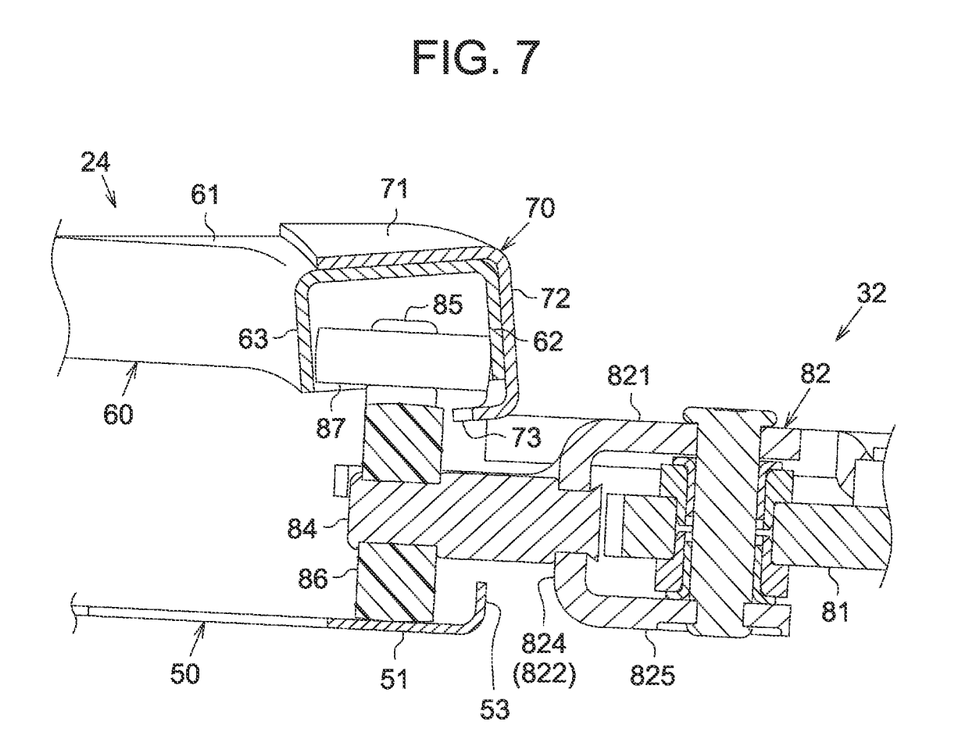
FIG. 7 is a sectional view showing the engaging relationship between the upper rail and the upper hinge unit.

In this regard, as shown in FIG. 7, the upper rail 24 of this embodiment has the first restriction wall 53 and the second restriction wall 73. Therefore, when the upper hinge unit 32 is pulled as described above, the load roller 86 of the upper hinge unit 32 is likely to get caught on the first restriction wall 53 of the first rail 50 of the upper rail 24. Similarly, the two guide rollers 87 of the upper hinge unit 32 are likely to get caught on the second restriction wall 73 of the second rail 60 of the upper rail 24. Thus, although the first rail 50 and the second rail 60 may deform under a load acting on the sliding door 30, the load roller 86 and the two guide rollers 87 are less likely to fall off the first rail 50 and the second rail 60, respectively. In other words, the upper hinge unit 32 is less likely to fall off the upper rail 24.

As shown in FIG. 7, the load roller 86 shifts slightly in the axial direction in that the first restriction wall 53 deforms. Similarly, the two guide rollers 87 shift slightly in the axial direction in that the second restriction wall 73 deforms. Thus, the first restriction wall 53 and the second restriction wall 73 of this embodiment are not intended to reduce the axial shift of the load roller 86 and the axial shift of the two guide rollers 87 to zero. Rather, the first restriction wall 53 and the second restriction wall 73 reduce the amount of axial shift of the load roller 86 and the amount of axial shift of the two guide rollers 87.

Effects of this embodiment will be described. (1) The first rail 50 of the upper rail 24 includes the first restriction wall 53 that restricts the axial shift of the load roller 86. Thus, the load roller 86 is less likely to shift in the axial direction even when a load directed outward in the width direction acts on the sliding door 30. Therefore, the upper rail 24 can reduce the likelihood that the sliding door 30 may fall off the vehicle body 20 when a load acts on the sliding door 30.

(2) In the upper rail 24, the first rail 50 has the first restriction wall 53 that restricts the axial shift of the load roller 86 and the bottom wall 51 that includes the rolling surface of the load roller 86. Specifically, the bottom wall 51 and the first restriction wall 53 are formed as one part. This can reduce the number of parts composing the upper rail 24.

(3) When the sliding door 30 is located in the fully closed position, the load roller 86 is located on the curved part 51C of the bottom wall 51, and when the sliding door 30 is located in the fully opened position, the load roller 86 is located on the straight part 51S of the bottom wall 51. On the other hand, it is highly likely that the sliding door 30 is located in the fully closed position when the vehicle 10 has an accident. In this regard, in the first rail 50, the first restriction wall 53 extends from the curved part 51C of the bottom wall 51. In other words, in the first rail 50, the first restriction wall 53 does not extend from the straight part 51S of the bottom wall 51. Thus, the upper rail 24 can be provided with the first restriction wall 53 at a part of the bottom wall 51 where it is needed. Further, in the upper rail 24, the weight of the first rail 50 can be reduced and the amount of material composing the first rail 50 can be reduced.

(4) The second rail 60 of the upper rail 24 includes the second restriction wall 73 that restricts the motion of the two guide rollers 87 in the axial direction. Thus, even when a load directed outward in the width direction acts on the sliding door 30, the two guide rollers 87 are less likely to shift in the axial direction. Therefore, the upper rail 24 can further reduce the likelihood that the sliding door 30 may fall off the vehicle body 20 when a load acts on the sliding door 30.

(5) In the upper rail 24, the second restriction wall 73 is provided on the reinforcing rail 70 that is formed as a separate part from the second rail 60. Thus, compared with when the second restriction wall 73 is provided on the second rail 60, the second rail 60 is easier to form. For example, when the second rail 60 is formed by extrusion, it is difficult to provide the second restriction wall 73 only on the curved part 60C of the second rail 60.

(6) Of the upper hinge unit 32, the center hinge unit 33, and the lower hinge unit 34, a hinge unit that is most likely to fall off the guide rail when a load directed outward in the width direction acts on the sliding door 30 is the upper hinge unit 32. In this regard, in the above embodiment, the upper rail 24 includes the first restriction wall 53 and the second restriction wall 73. Therefore, the likelihood of the sliding door 30 falling off the vehicle body 20 can be effectively reduced.

(7) In the first rail 50 of the upper rail 24, the branch wall 52 fixed to the first panel 22 and the first restriction wall 53 are located close to each other. Therefore, when a load directed outward in the width direction acts on the sliding door 30, the force of the load roller 86 pressing the second restriction wall 73 can be borne by the branch wall 52. In other words, since the branch wall 52 and the first restriction wall 53 are not located far away from each other, the moment acting on the first rail 50 when such a load acts on the sliding door 30 is likely to be small.

Figure 8:
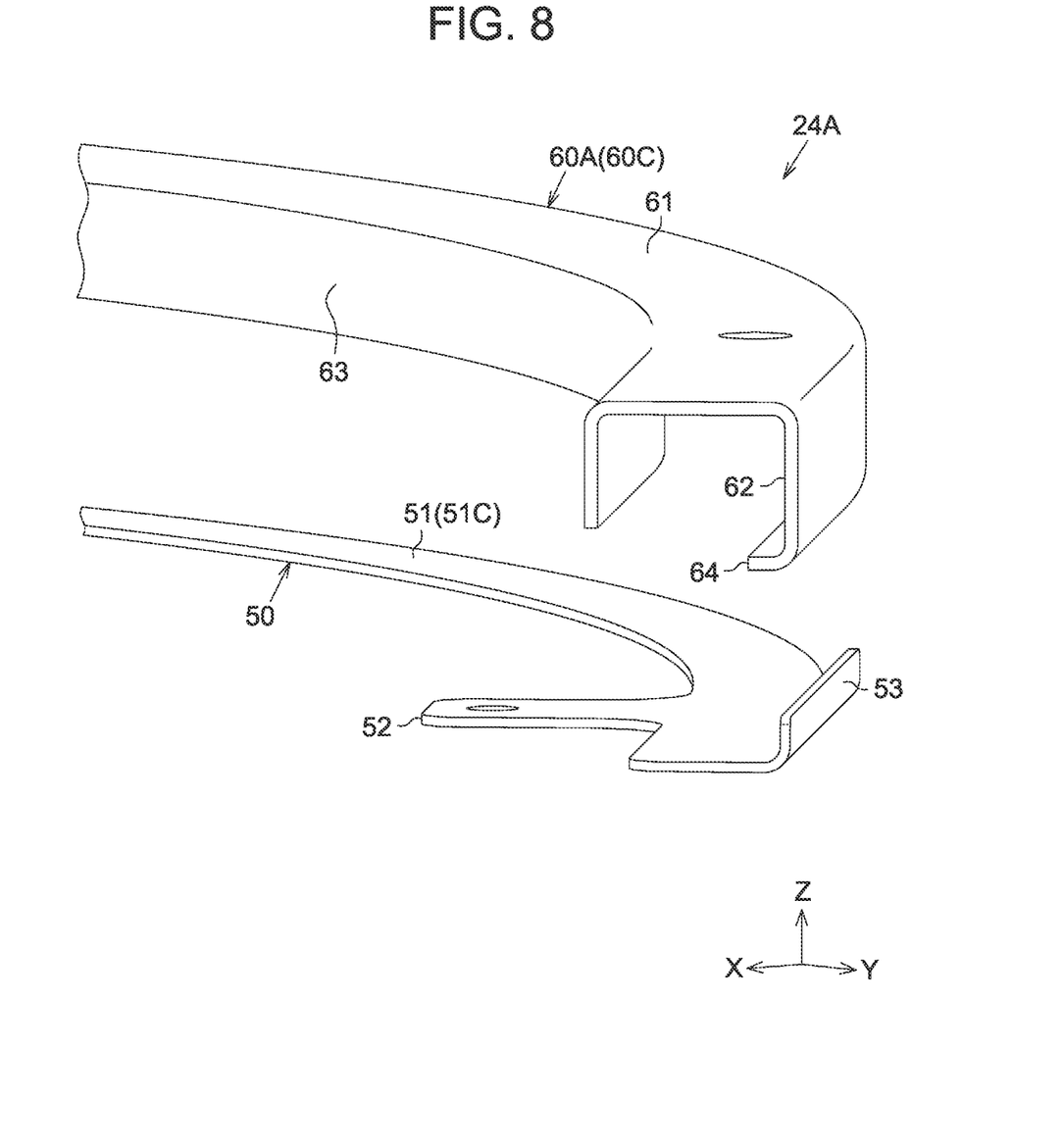
FIG. 8 is a perspective view of a front end portion of an upper rail according to a modified example.

This embodiment can be implemented with the following changes made thereto. This embodiment and the following modified examples can be implemented in combination within such a range that no technical inconsistency arises. As shown in FIG. 8, a second rail 60A of an upper rail 24A may include a second restriction wall 64. The second restriction wall 64 bends and extends from a side wall 62 of the second rail 60A. It is preferable that the second restriction wall 64 be provided at least on a curved part 60C of the second rail 60A.

The upper rail 24 need not include the second restriction wall 73 if it includes the first restriction wall 53. This configuration can also produce the effects (1) and (2) of the above embodiment. In the first rail 50, the first restriction wall 53 may be a separate part from the bottom wall 51. In this case, the first restriction wall 53 may be fixed to the first panel 22. The first restriction wall 53 may have, for example, a block shape.

In the first rail 50, the first restriction wall 53 may be provided on the bottom wall 51, from end to end in the long-side direction. The first rail 50 need not include the branch wall 52. In this case, it is preferable that the bottom wall 51 be more firmly fixed to the first panel 22.

It is preferable that the first restriction wall 53 extend in a direction orthogonal to the rotational axis of the load roller 86. However, the first restriction wall 53 may extend in a direction slightly inclined relatively to this orthogonal direction. Similarly, it is preferable that the second restriction wall 73 extend in a direction orthogonal to the rotational axes of the guide rollers 87. However, the second restriction wall 73 may extend in a direction slightly inclined relatively to this orthogonal direction.

The sliding door 30 may be configured to open by moving frontward and close by moving rearward. The opening and closing direction of the sliding door 30 need not be the front-rear direction.

What is claimed is:

1. A guide rail that is installed in a vehicle body having a door opening and defines a moving direction of a sliding door that opens and closes the door opening, the sliding door having a hinge unit including a load roller that rotates around an axis of the load roller extending in a horizontal direction and two guide rollers that each rotate around a respective guide-roller axis extending in an up-down direction, the guide rail comprising:
    a first rail that has a bottom wall on which the load roller rolls and supports weight of the sliding door;
    a second rail that has side walls on which the two guide rollers roll and defines the moving direction of the sliding door;
    a first restriction part that restricts motion of the load roller in a direction along the axis of the load roller;
    a second restriction part that restricts motion of each of the two guide rollers in a direction along the respective guide-roller axis; and
    a reinforcing rail that is fixed to the second rail, wherein the reinforcing rail has the second restriction part.

2. The guide rail according to claim 1, wherein the first rail has, as the first restriction part, a first restriction wall that extends from the bottom wall in a direction intersecting the bottom wall.

3. The guide rail according to claim 2, wherein:
    as seen in a plan view from a plate thickness direction, the bottom wall has a straight part that extends straight and a curved part that extends in an arc shape from an end portion of the straight part; and
    the first restriction wall extends from the curved part of the bottom wall.

4. The guide rail according to claim 1, wherein the guide rail is applied as an upper rail that is disposed at a higher level than the door opening.

* * * * *